United States Patent Office.

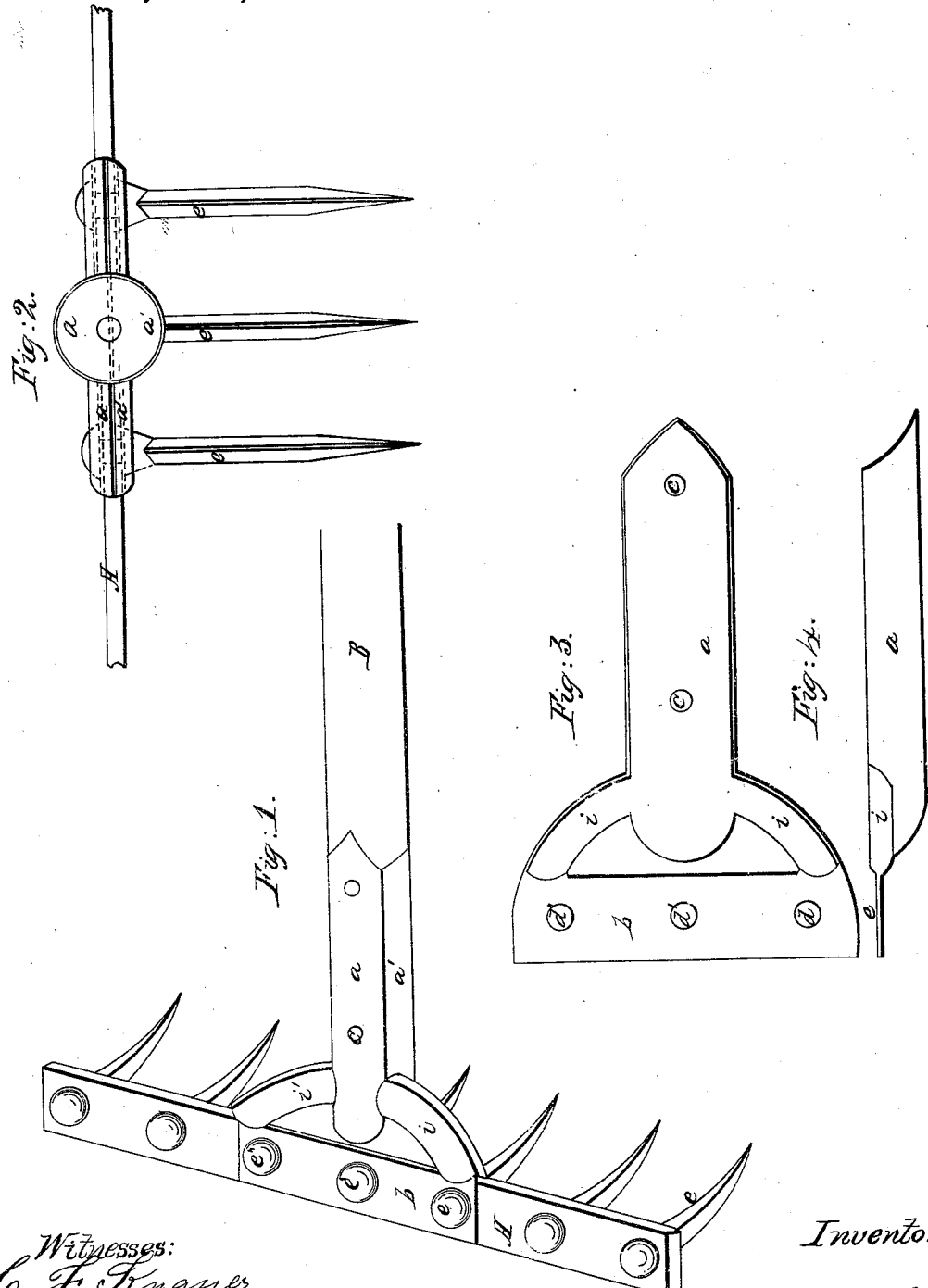

JOHN CHR. KLEIN, OF BIRMINGHAM, PENNSYLVANIA.

Letters Patent No. 91,027, dated June 8, 1869.

IMPROVED RAKE.

The Schedule referred to in these Letters Patent and making part of the same.

*To all whom it may concern:*

Be it known that I, JOHN CHR. KLEIN, of Birmingham, in the county of Allegheny, and State of Pennsylvania, have invented a new and improved Mode of Constructing Straps for Rakes, for the purpose of connecting the wooden handle with; and I do hereby declare that the following is a full, clear, and exact description thereof, reference being had to the accompanying drawings, making a part of this specification, in which—

Figure 1 is a perspective view.

Figure 2, a longitudinal elevation.

Figures 3 and 4, detached views of a single half strap.

The nature of my invention consists in making what is called the shank for rakes and other utensils in halves, like straps on shovels, &c., whereby the wooden handle is connected.

Heretofore these handle-straps or shanks had to be forged into their various shapes, while I cut and stamp them to the required size and shape out of sheet-iron or steel. By this process I save considerable in time and metal; it also makes a neat and strong article when combined.

To enable others skilled in the art to make my invention, I will proceed to describe its construction.

I first cut and stamp the plates out of sheet-metal to the required size and shape, as seen in figs. 3 and 4.

The part $a$, where the wooden handle enters, is pressed to a semicircle; the part $i\ i'$ is corrugated, to give additional strength. Holes $c\ c'$ and $d\ d'\ d''$ are punched, the first to admit the rivets through the wooden handle; the others, on the flat portion $b$, correspond with holes in the rake-body A, and the straps are riveted, one above, the other below the body A, either direct with the teeth or by separate rivets.

Having thus fully described my invention,

I claim as new, and desire to secure by Letters Patent—

A divided socket, in combination with a rake, for securing the latter to its handle, when the socket is formed in two divisions, each consisting of a strap-plate, $b$, carrying a curved or semi-cylindrical socket-piece, $a$, when the former is so widened as to partially embrace the latter, and is provided with a curved or corrugated rim or bead, $i$, along its upper edges on either side of the socket, to brace and strengthen the same, all substantially as herein set forth.

Also, rivets $e\ e$, securing a rake-bar, A, to the metallic socket receiving and securing its handle, when said rivets are so extended as to constitute appropriate central teeth in the rake, substantially as herein set forth.

JOHN CHR. KLEIN.

Witnesses:
FRED. C. KLEIN,
ED. P. LOGAN.